O. SOMMER.
AUTOMATIC SEGMENT WEIR.
APPLICATION FILED JAN. 19, 1920.
1,363,820.
Patented Dec. 28, 1920.
3 SHEETS—SHEET 2.
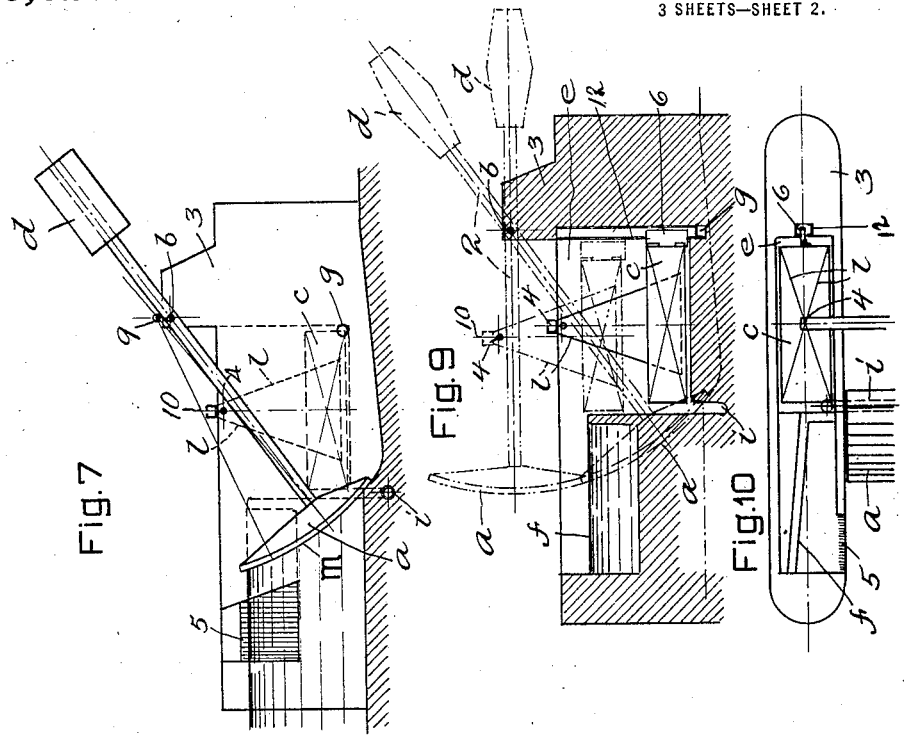
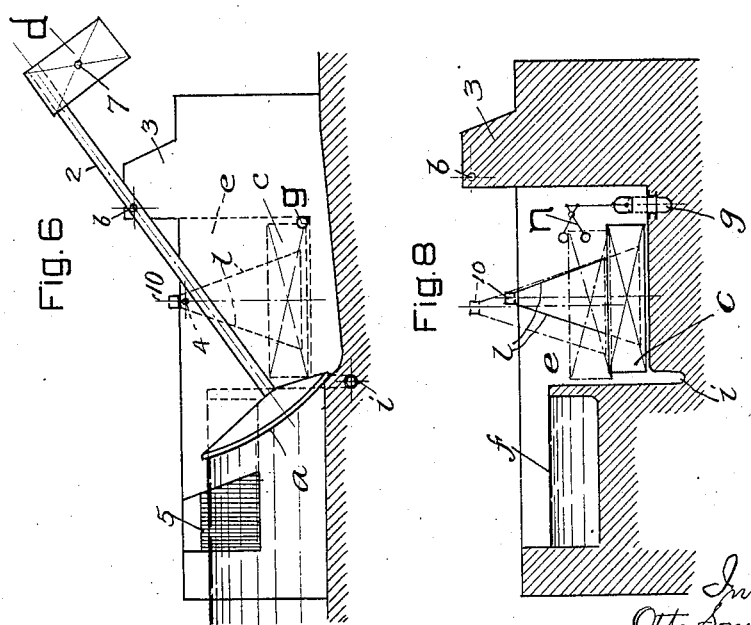

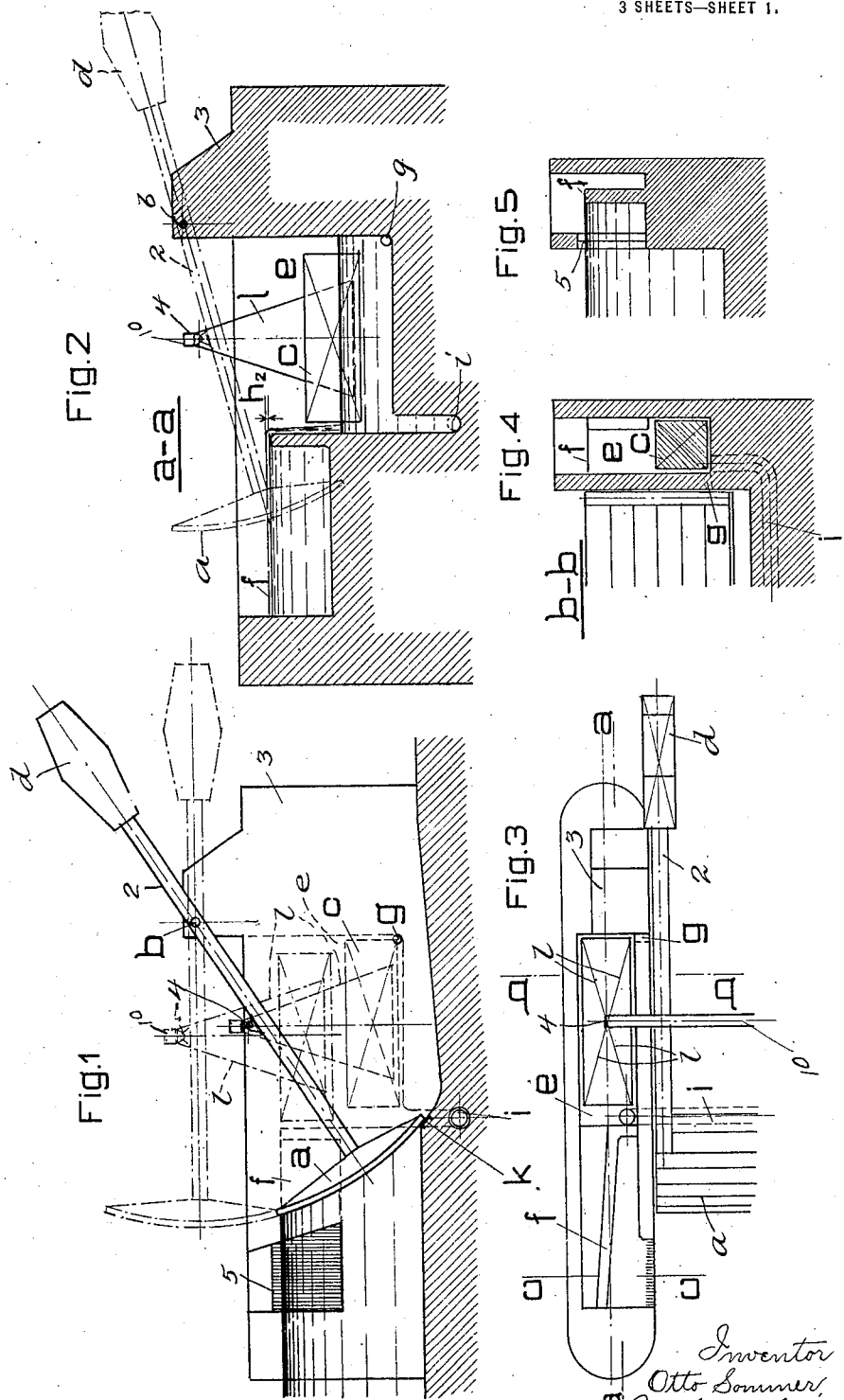

O. SOMMER.
AUTOMATIC SEGMENT WEIR.
APPLICATION FILED JAN. 19, 1920.

1,363,820.

Patented Dec. 28, 1920.
3 SHEETS—SHEET 3.

Inventor
Otto Sommer

UNITED STATES PATENT OFFICE.

OTTO SOMMER, OF ZURICH, SWITZERLAND, ASSIGNOR TO STAUWERKE, A.-G., OF ZURICH I, SWITZERLAND.

AUTOMATIC SEGMENT-WEIR.

1,363,820.  Specification of Letters Patent.  Patented Dec. 28, 1920.

Application filed January 19, 1920. Serial No. 352,562.

*To all whom it may concern:*

Be it known that I, OTTO SOMMER, a citizen of the Republic of Switzerland, residing at Zurich, Switzerland, have invented certain new and useful Improvements in Automatic Segment-Weirs; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention has for its object to provide an automatic segment weir. In the accompanying drawings, Figures 1 to 11 show one method of carrying out this invention;—

Fig. 1 is a section through the segment weir showing the water chamber at one side of the dam.

Fig. 2 is a section in the line $a$—$a$ of Fig. 3.

Fig. 3 is a top view of Fig. 1.

Fig. 4 is a section in the line $b$—$b$ of Fig. 3, and

Fig. 5 is a section in the line $c$—$c$ of Fig. 3.

Fig. 6 is a modification showing the center of gravity of the counterweight below a straight line passing through the pivot points of the counterweight and of the dam arm.

Fig. 7 is a modification wherein the pivot of the dam is below the center of segment.

Fig. 8 is a longitudinal section showing a control weight-actuated valve controlling the discharge of water from the counterweight chamber.

Fig. 9 is a section and Fig 10 a plan of means for positively controlling the size of the discharge control weight chamber by the movement of the control weight or floats.

Figure 11:
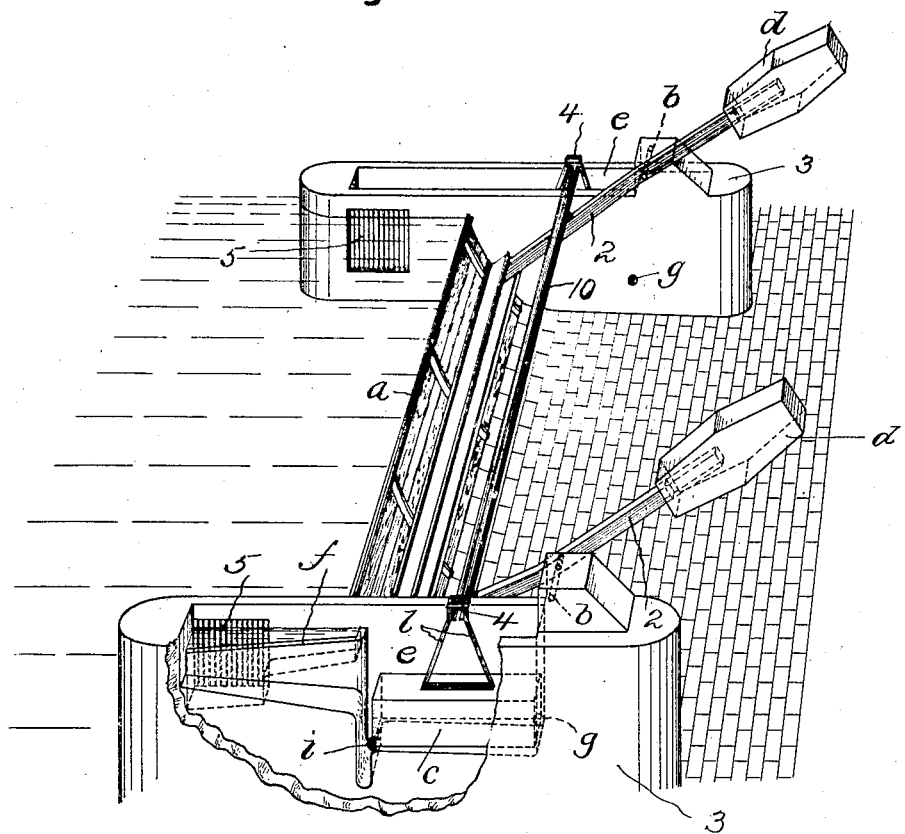
Fig. 11 is a perspective view of the arrangement illustrated in Figs. 1–5.

The automatic segment weir comprises a sluice gate $a$ (damming member) of the well-known type, mounted on arms 2 and rotating around an axis, that is to say around pivots $b$ which bear on lateral pillars 3 or on the masonry on each bank. The rotation axis $b$ coincides with the centers of the sluice gate segment (or is close thereto).

The sill $k$ on which the damming member is supported in closed position is preferably made aslope in the direction of downstream so as to prevent shingle and other subsiding material from depositing, whereby tight closing of the sluice gate is rendered possible.

The following forces (besides the net weight of the sluice gate and the water pressure acting in the direction of the rotation axis) act upon the lever arms 2 connecting the damming member $a$ to the rotation axis $b$; counterweights $d$ having the tendency to raise the sluice gate, and control weight $c$ having the tendency to lower the same. The control weights $c$ are pivotally suspended at 4 by suspensions $l$ from the lever arms 2, through the intermediary of a cross bar 10, between sluice gate $a$ and pivots $b$. Each weight is surrounded by one of the reservoirs (water chambers) $e$ and is disposed laterally to the opening of the weir (in the bank masonry or pillar 3). Said reservoirs communicate with the upstream side by means of an overflow $f$, and with the downstream side by discharge port-holes $g$. The inlet port-holes 5 to the overflows can be disposed, as shown in Fig. 3 in the side walls parallel to the stream or in the front sides of the pillars vertically to the stream. Both reservoirs $e$ may be connected one to the other by means of a piping $i$ so as to insure equal water levels therein. The edges of the overflows $f$ are near the head-water level to be regulated or on the same level therewith. As long as the water level does not rise above the overflows $f$, the reservoirs $e$ are empty and the weights $c$ floating free therein pull the sluice gate down onto the tightening sill $k$. The spaces left between the weights $c$ and the sides of the reservoirs $e$ are as small as possible. The weight of the parts $c$ is preferably somewhat greater than the force of buoyancy to which they are subjected when submerged so that the suspension $l$ should always be under tensile stress and the link may be constructed so as to form an edge-bearing, without risk of being lifted out.

When the upstream water rises above the overflow $f$, the reservoirs fill up to a certain height $h$, depending on the overflow length, the overflow height $h_2$ and the size of the discharge port-holes $g$. By a proper choice of the overflow length and of the discharge port hole, an overflow height of an inch or so suffices to fill up the reservoirs to such a height that the buoyancy acting upon the parts *c* makes the counter-weight *d* overbalance the forces having the tendency to close the sluice gate. The sluice gate *a* thus commences to open and continues to move until the rise of the parts *c* reduces the force of buoyancy produced by the water-contents of the reservoirs acting upon said parts *c* to such an extent that the raising and lowering forces balance each other again. A further slight rise of the upstream level and the resulting increase of the quantity of water passing over the overflows *f* makes the water level in the reservoirs *e* also rise, whereupon the sluice gate *a* continues to open. The reverse process takes place with the falling back-water level. If the back-water (upstream) level subsides to the height of the overflow edge *f* or beneath it, the afflux to the reservoirs *e* ceases, and they empty; the sluice gate *a* is pulled down onto its seating *k* by the weight of the parts *c* and vigorously pressed against it so that a tight seat is thereby insured.

The parts *c* which have some little scope for longitudinal movement in the reservoirs *e* and are surrounded by water, act as hydraulic brakes and thereby prevent swinging.

The stability of regulation may be increased by making the water levels in the reservoirs *e* and therewith the force of buoyancy to which parts *c* are subjected dependent on the position of the sluice gate *a*, so that a rise of the sluice gate lowers the water level in the reservoir *e*, and a lowering of the sluice gate raises said level. This may be accomplished as shown in Figs. 9 and 10, by controlling the size of the discharge port hole *g* by means of a throttling organ 6 which is positively connected to the sluice gate in such a way that a rise of the sluice gate increases the size of the discharge port hole. This throttling organ is simply a board 6 secured to brackets 11 composed of angle iron fastened to one end of the member *c*. This board 6 projects between two spaced channel irons 12 that form a vertical chamber communicating with the discharge port *g*. This board also prevents lateral swinging of the weights *c*.

Another method of increasing the stability of regulation consists in causing the level arms of the lowering forces to increase during the rising motion of the sluice gate in a larger measure than those of the raising forces. This may be achieved, as shown in Fig. 6, by disposing the center of gravity 7 of the counter-weights *d* beneath the straight line or longitudinal axis of arms 2 passing through the pivot points *b*, or, as shown in Fig. 7 by placing the pivot point *b* beneath the center 9 of segment *m* of the sluice gate.

In the latter case, the water-pressure on the curved sluice gate surface has in the closing position, a moment having an opening tendency such moment diminishing with the rise of the sluice gate (as this emerges more and more) and being in full open position (horizontal position of the sluice gate arms) equal to zero. The consequence of the varying increase of the moments is that a somewhat deeper submersion of the parts *c* corresponds to every higher position of the sluice gate, exactly as required for the stability of regulation.

It may also be desired that the sluice gate should speedily continue to open farther to a certain distance after it has attained a certain opening (normally when its lower edge has risen to the height of the normal back-water level) and the water level continues to rise, that is to say, in case of a flood. This may be achieved by having the discharge portholes *g* from reservoirs *e* automatically closed, or considerably reduced, at a predetermined position of the sluice gate *a*, for instance, as shown in Fig. 8, by means of throttling slide valves 8 positively operated by the sluice gate by means of rods *n*. The reservoirs *e* then fill up entirely and the force of buoyancy being considerably increased thereby, raises the parts *c*, and thus the sluice gate *a*, to its highest position. The sluice gate remains in this position until the headwater falls to the height of the overflow edge *f*, that is to say, until it reaches its normal level. Thereupon the water runs off from the reservoirs *e* through the discharge portholes *g* which are reduced, but not entirely closed. In the meantime the rods *n* automatically increase the discharge port-holes *g* by opening the throttling valves 8 the reservoirs speedily emptying and the sluice gate rapidly closing, as far as required, for preventing the back-water surface from falling below the normal level.

I claim—

1. In an automatic segment weir having a damming element; arms, pivots for said arms, counterweights at the ends of the arms, control weights connected to the aforesaid elements between the pivots and damming element, and overflow chambers for said control weights arranged to receive up-stream water and having discharges to the downstream water.

2. In a segment weir according to claim 1, a sill sloping toward the down stream on which the damming member rests when closed, the slope preventing shingle and the like from depositing on the sill.

3. In a segment weir as claimed in claim 1, throttling means positively operated by the damming member, said means controlling the discharge from the weight chambers.

4. In a segment weir as claimed in claim 1, means to automatically reduce the discharge from the overflow chambers at a pre-determined position of the damming element.

5. In a segment weir according to claim 1, the rotation axis of the sluice gate being disposed beneath the center of the segment of the damming wall for the sake of increasing the stability of regulation, substantially as described.

6. A segment weir as claimed in claim 1, in which the center of gravity of the counterweight is beneath a straight line passing through the point of suspension of the counterweights and the pivot point.

In testimony that I claim the foregoing as my invention, I have signed by name in presence of two subscribing witnesses.

OTTO SOMMER.

Witnesses:
    LOUISE WEBER,
    C. M. AURIG.